(12) United States Patent
Yao et al.

(10) Patent No.: US 8,047,324 B2
(45) Date of Patent: Nov. 1, 2011

(54) ALL TERRAIN VEHICLE

(75) Inventors: Hiroto Yao, Shizuoka (JP); Tetsuo Nojima, Shizuoka (JP); Kazutoshi Baba, Shizuoka (JP); Yutaka Hatakeyama, Shizuoka (JP)

(73) Assignee: Suzuki Motor Corporation, Hamamatsu-shi, Shizuoka (JP)

( * ) Notice: Subject to any disclaimer, the term of this patent is extended or adjusted under 35 U.S.C. 154(b) by 648 days.

(21) Appl. No.: 11/747,510

(22) Filed: May 11, 2007

(65) Prior Publication Data

US 2007/0261906 A1 Nov. 15, 2007

(30) Foreign Application Priority Data

May 12, 2006 (JP) .................... 2006-134365

(51) Int. Cl.
*B60K 13/02* (2006.01)
*B60K 13/04* (2006.01)
(52) U.S. Cl. ....................... 180/296; 180/68.3
(58) Field of Classification Search ............. 180/291, 180/292, 296, 297, 309, 68.3, 908
See application file for complete search history.

(56) References Cited

U.S. PATENT DOCUMENTS

| 4,340,024 | A | * | 7/1982 | Suzuki et al. | 123/538 |
|---|---|---|---|---|---|
| 4,476,841 | A | * | 10/1984 | Duckworth | 123/557 |
| 4,535,866 | A | * | 8/1985 | Shiga | 180/215 |
| 4,596,301 | A | * | 6/1986 | Nagashima | 180/215 |
| 4,699,234 | A | * | 10/1987 | Shinozaki et al. | 180/233 |
| 4,714,126 | A | * | 12/1987 | Shinozaki et al. | 180/233 |
| 4,770,262 | A | * | 9/1988 | Yasunaga et al. | 180/68.1 |
| 4,898,142 | A | * | 2/1990 | Van Wechem et al. | 123/557 |
| 5,076,387 | A | * | 12/1991 | Oka | 180/215 |
| 5,323,989 | A | * | 6/1994 | Hamada et al. | 248/60 |
| 5,445,133 | A | * | 8/1995 | Nemoto | 123/520 |
| 6,695,083 | B2 | * | 2/2004 | Nakamura et al. | 180/68.1 |
| 6,719,084 | B2 | * | 4/2004 | Kuji et al. | 180/309 |
| 6,732,830 | B2 | * | 5/2004 | Gagnon et al. | 180/291 |
| 6,758,300 | B2 | * | 7/2004 | Kromis et al. | 180/309 |
| 6,805,214 | B2 | * | 10/2004 | Maeda et al. | 180/69.4 |
| 6,968,917 | B2 | * | 11/2005 | Rondeau et al. | 180/89.1 |
| 6,971,371 | B2 | * | 12/2005 | Hotta et al. | 123/470 |
| 2008/0053737 | A1 | * | 3/2008 | Cerri | 180/309 |

FOREIGN PATENT DOCUMENTS

| JP | 61-166780 A | 7/1986 |
|---|---|---|
| JP | 62-11029 U | 1/1987 |
| JP | 2005-001510 A | 1/2005 |

* cited by examiner

*Primary Examiner* — Frank Vanaman
(74) *Attorney, Agent, or Firm* — McDermott Will & Emery LLP

(57) ABSTRACT

Aiming at providing a straddle-type all terrain vehicle effectively improved in the operational stability of vehicle and engine performance, power transmissions transmitting driving force of a power unit to a rear axle shaft, and braking devices exerting braking force to rear wheels are provided respectively at both side of an end of a rear swing arm in the vehicle width direction, and an exhaust silencer is disposed in a space between the power transmissions and the braking devices, below a seat.

9 Claims, 8 Drawing Sheets

F I G. 7
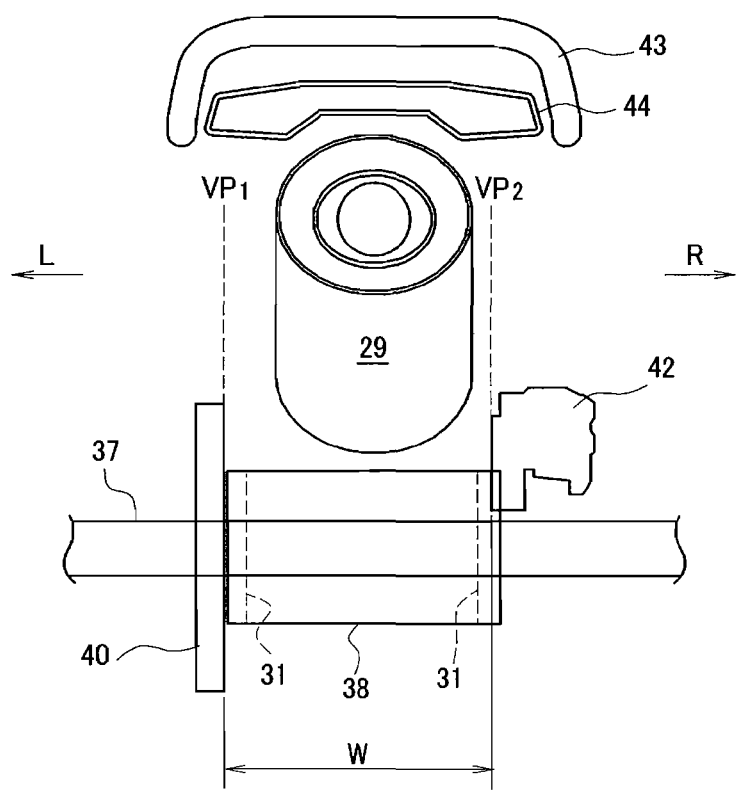
F I G. 8
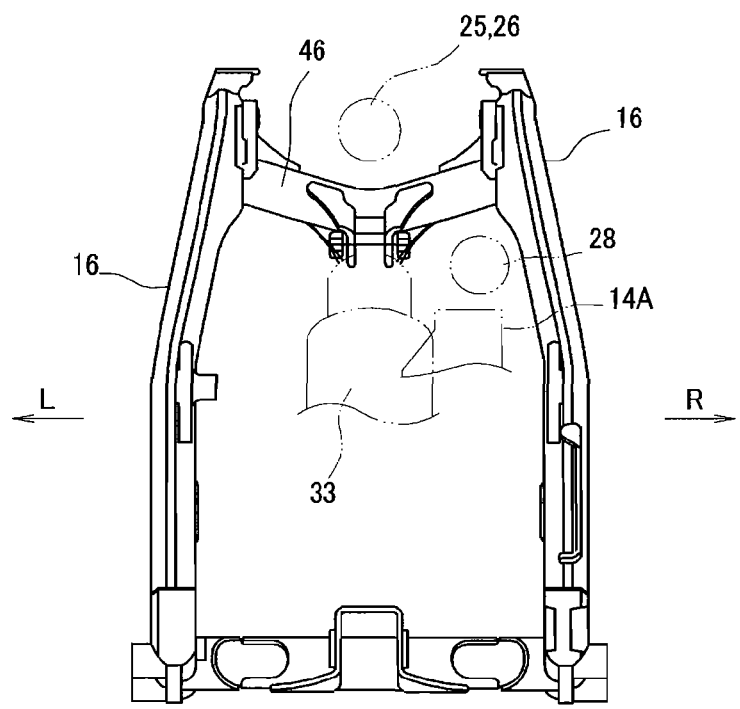

ALL TERRAIN VEHICLE

CROSS-REFERENCE TO RELATED APPLICATIONS

This application is based upon and claims the benefit of priority from the prior Japanese Patent Application No. 2006-134365, filed on May 12, 2006, the entire contents of which are incorporated herein by reference.

BACKGROUND OF THE INVENTION

1. Field of the Invention

The present invention relates to a straddle-type vehicle typically referred to as ATV (all terrain vehicle).

2. Description of the Related Art

This sort of vehicle exhibits excellent drivability not only in on-road driving, but also under severe driving conditions typically in off-road driving or at the waterside, showing a high level of mobility. The basic configuration is typically such as having four wheels on the front and rear sides of a chassis frame, a steering device between the front wheels, an engine mounted on the chassis frame, and a fuel tank, a seat and so forth placed thereabove.

Operational stability during driving is a matter of great importance particularly for so-called performance ATV oriented to racing, so that the engine mass is necessarily centralized in order to fulfill the requirement. A specific example of conventional all terrain vehicle will be outlined. Referring to FIGS. 9A and 9B, an engine 1 is mounted on a chassis frame 2 as being located at the center of the vehicle, front wheels 3 are disposed at the front portion of the chassis frame 2, and rear wheels 4 are disposed at the rear portion of the chassis frame 2.

In an exhaust system in this example, an exhaust pipe 5 connected to an engine cylinder on the front side of the engine 1 is once projected towards the front, then routed through one side of the engine 1 (on the right side in the illustrated example) in the tread-wise direction, and extended towards the rear of the vehicle. The exhaust pipe 5 is further extended to a muffler 7 disposed on the rear side of an air cleaner 6, and connected thereto. The muffler 7 is mounted aside a seat rail 9 supporting a seat 8.

The muffler 7 is a heavy matter in the conventional all terrain vehicle, causative of deflection of the center of gravity towards the side where the muffler 7 is disposed (right side in this example), and this largely affects the operational stability of the vehicle. In particular, the lateral balance affects the straight drivability, cornering performance, sliding control performance, grip feeling and so forth. Such deflection in disposition of the muffler 7 from the center of gravity of the vehicle also increases moments in the yaw direction and the roll direction, and affects the motion performance, steering, anti-roll property and so forth.

Also twisting force is exerted on the seat rail 9 supporting the muffler 7, and this raises a need of high rigidity and strength of the seat rail 9 in order withstand the twisting force. The seat rail 9 is sometimes formed as being curved so as to ensure a necessary gap or clearance with respect to the muffler 7 and the exhaust pipe 5, or may tend to deform because the distance between the individual components in the vertical direction is limited. Reinforcement as a countermeasure therefor results in increase in the weight, and also warping and increase in weight of the seat rail 9 adversely affect the operational stability.

Furthermore, for vehicles having a large cushion stroke of the rear wheels 4, it is necessary to ensure a sufficient gap with respect to a rear wheel brake caliper. In order to ensure the gap, it is necessary to dispose the muffler 7 and so forth in an outer portion or in the side portion, but such positional relation unless otherwise being modified inevitably raises a disadvantage in terms of the operational stability.

Japanese Utility Model Application Laid-Open No. S62-11029 discloses this sort of all terrain vehicle having a muffler disposed nearly at the center position between the left and right rear wheels.

Considering the above-described situation, the present invention is aimed at providing a straddle-type all terrain vehicle capable of effectively improving, in particular, the operational stability, the engine performance and the like.

SUMMARY OF THE INVENTION

According to the present invention, there is provided a straddle-type all terrain vehicle which includes left and right front wheels and rear wheels, a power unit including an engine and a transmission integrated therewith, mounted in the midship section of the vehicle body between said front and rear wheels, a fuel tank disposed above said power unit, a rider's seat provided on the rear section of the vehicle body behind said fuel tank, and a rear swing arm mounted on the vehicle body swingable in the vertical direction, rotatably supporting a rear axle shaft at the rear end thereof, wherein a power transmission transmitting driving force of said power unit to said rear axle shaft, and a rear braking device are disposed respectively at both sides of an end of said rear swing arm in the vehicle width direction, and an exhaust silencer is disposed in a space between said power transmission and said rear braking device, under said rider's seat.

In the straddle-type all terrain vehicle of the present invention, further comprising a rear cushion unit supporting said rear swing arm as being vertically cushioned, and an air cleaner box supplying a clean air to said engine of said power unit, wherein said rear cushion unit, said air cleaner box and said exhaust silencer are disposed behind said power unit in line in the longitudinal direction.

The upper end of said rear cushion unit is supported by a bridge member suspended between a pair of left and right main frames, an air intake passageway connecting said air cleaner box and said engine is disposed above said bridge member, and an exhaust pipe connecting said engine and said exhaust silencer is disposed in a space between the top surface of an engine case of said power unit and said bridge member, away from said rear cushion unit in the vehicle width direction.

In the straddle-type all terrain vehicle of the present invention, said exhaust silencer is connected to the rear end of said exhaust pipe which extends from an exhaust port of said engine towards the rear side at a position below the center portion of said rider's seat, and said exhaust silencer is inclined downward to the front, from the rear end of said rider's seat towards a swing pivot of said rear swing arm.

In the straddle-type all terrain vehicle of the present invention, said exhaust silencer is supported, at the front portion and the rear portion thereof, by a pair of rear frames extended from said pair of left and right main frames towards the rear so as to hold thereon said rider's seat, a front supported portion thereof being provided on one side in the vehicle width direction in which said exhaust pipe is connected, and a rear supported portion thereof being provided at least on the opposite side of said front supported portion.

In the straddle-type all terrain vehicle of the present invention, said exhaust pipe is connected to the front end of said exhaust silencer, as being routed below said bridge member and beside the lower portion of said air cleaner box, and said air cleaner box is provided with an air intake port disposed on the top surface portion thereof opposed to the bottom surface of said rider's seat.

In the straddle-type all terrain vehicle of the present invention, said power transmission comprises a driving sprocket provided on said power unit, a driven sprocket provided on said rear axle shaft, and a driving chain connected therebetween.

According to the present invention, by disposing the muffler having a relatively large weight at the center portion of the vehicle in the tread-wide direction, the weight of the vehicle in the tread-wise direction thereof becomes well-balanced, and thereby the operational stability improves. Because the muffler is disposed between the shaft bush of the rear axle shaft having a small outer dimension and the seat in this case, a long cushion stroke of the rear wheels can be ensured, and thereby the vehicle becomes more comfortable to ride, capacity of the muffler can be increased, and thus the silencing performance and the engine output performance are improved.

The engine output performance can be improved also by forming the air intake passageway according to a smooth curve and thereby improving the air intake efficiency. In this case, the air intake passageway and the exhaust pipe are disposed as being vertically separated while placing the bridge member in between, so that the charging efficiency in the process of air intake can be improved, wherein the near-straight disposition of the exhaust pipe successfully reduces the discharge resistance, and thereby improves the output.

It is still also made possible to enlarge the capacity of the air cleaner box disposed under the center portion of the seat, and to ensure a large gap between the seat and the muffler, so that hot air can be prevented from being stagnated, and the charging efficiency in the process of air intake process can consequently be improved.

BRIEF DESCRIPTION OF THE DRAWINGS

FIG. 7 is a drawing of the muffler and the peripheral components according to the embodiment of the present invention, as viewed from the rear side of the vehicle;

FIG. 8 is a drawing showing a relation of arrangement of an air intake passageway and an exhaust pipe according to the embodiment of the present invention.

DETAILED DESCRIPTION OF THE PREFERRED EMBODIMENTS

Paragraphs below will explain a preferred embodiment of the straddle-type all terrain vehicle of the present invention, referring to the attached drawings.

Figure 1:
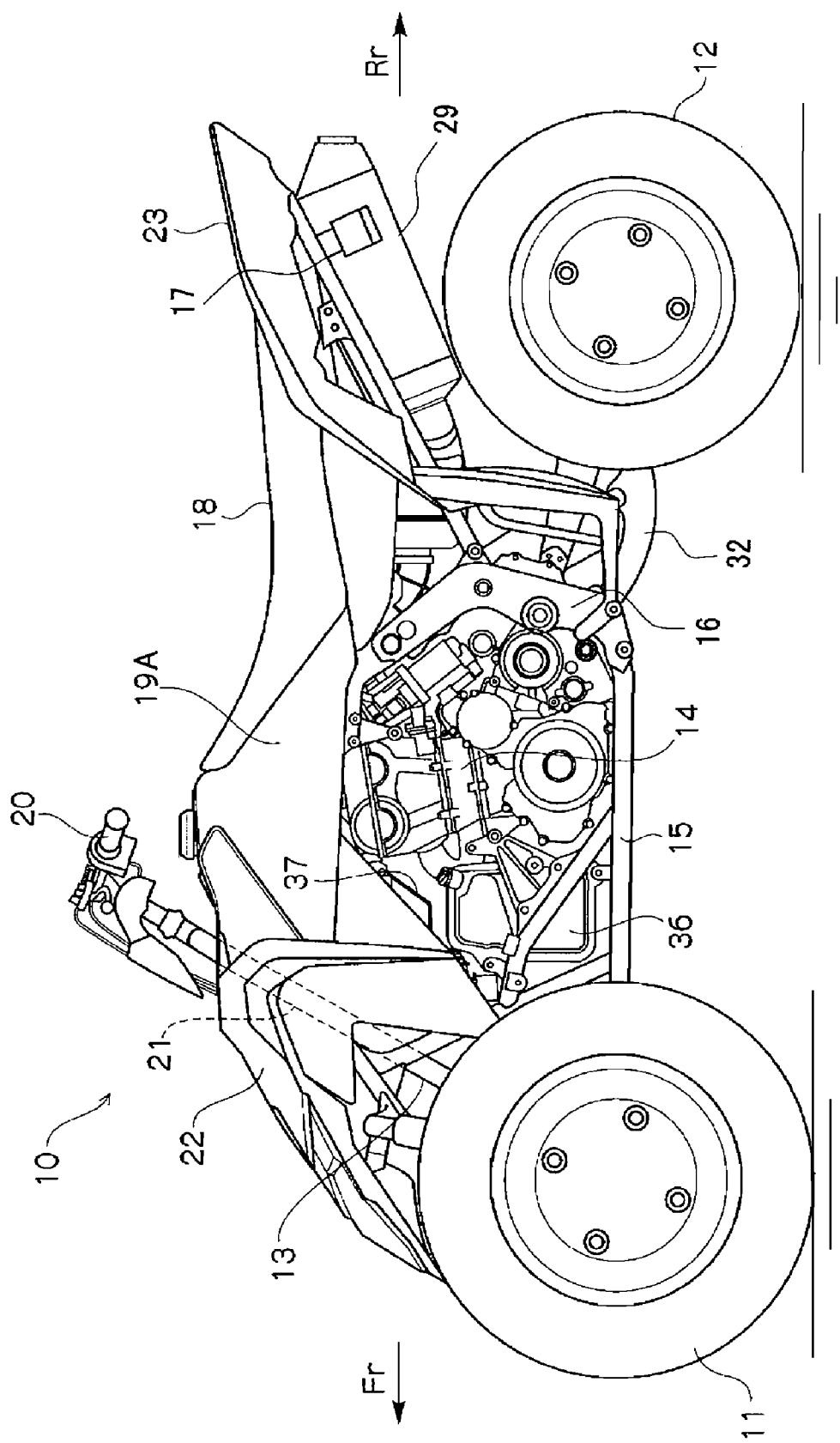
FIG. 1 is a side elevation showing an example of the all terrain vehicle according to an embodiment of the present invention.
Figure 2:
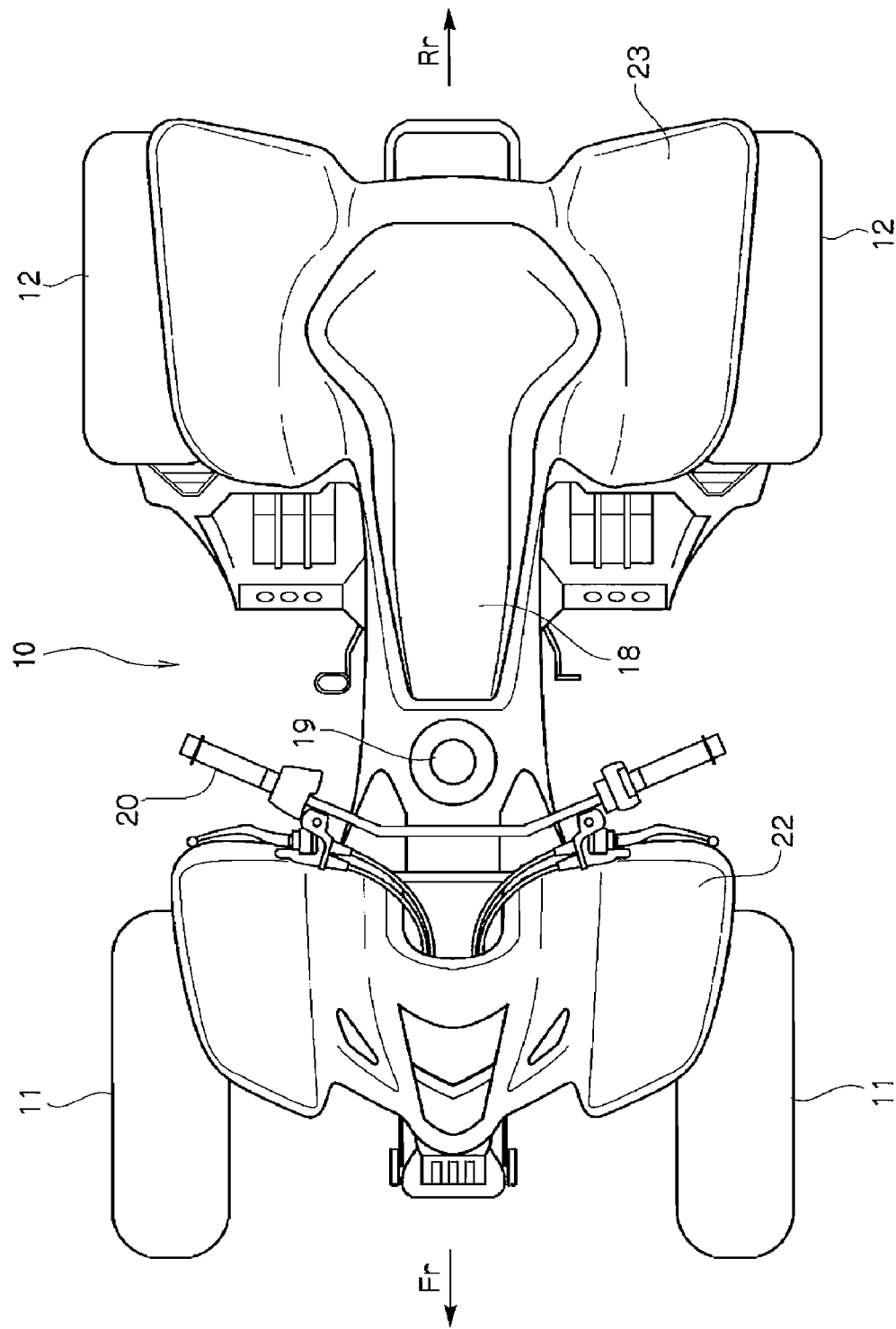
FIG. 2 is a plan view showing an example of the all terrain vehicle according to the embodiment of the present invention.

FIG. 1 and FIG. 2 show all terrain vehicle according to one embodiment of the present invention, wherein a straddle-type, four-wheeled vehicle 10 will be exemplified in this embodiment. An overall configuration of the straddle-type, four-wheeled vehicle 10 of this embodiment will be explained referring to FIG. 1 and FIG. 2. In these drawings, arrow Fr indicates the front, and arrow Rr indicates the rear. The left and right will be indicated by R and arrow L, respectively. A straddle-type, four-wheeled vehicle 10 has a steel-pipe-made chassis frame composing the basic skeleton, wherein in the basic configuration, the chassis frame has front wheels 11 and rear wheels 12 disposed at the front and the rear thereof, respectively, has a steering device 13 equipped between the front wheels 11, and has an engine unit 14 mounted on the chassis frame between the front wheels 11 and rear wheels 12.

Figure 3:
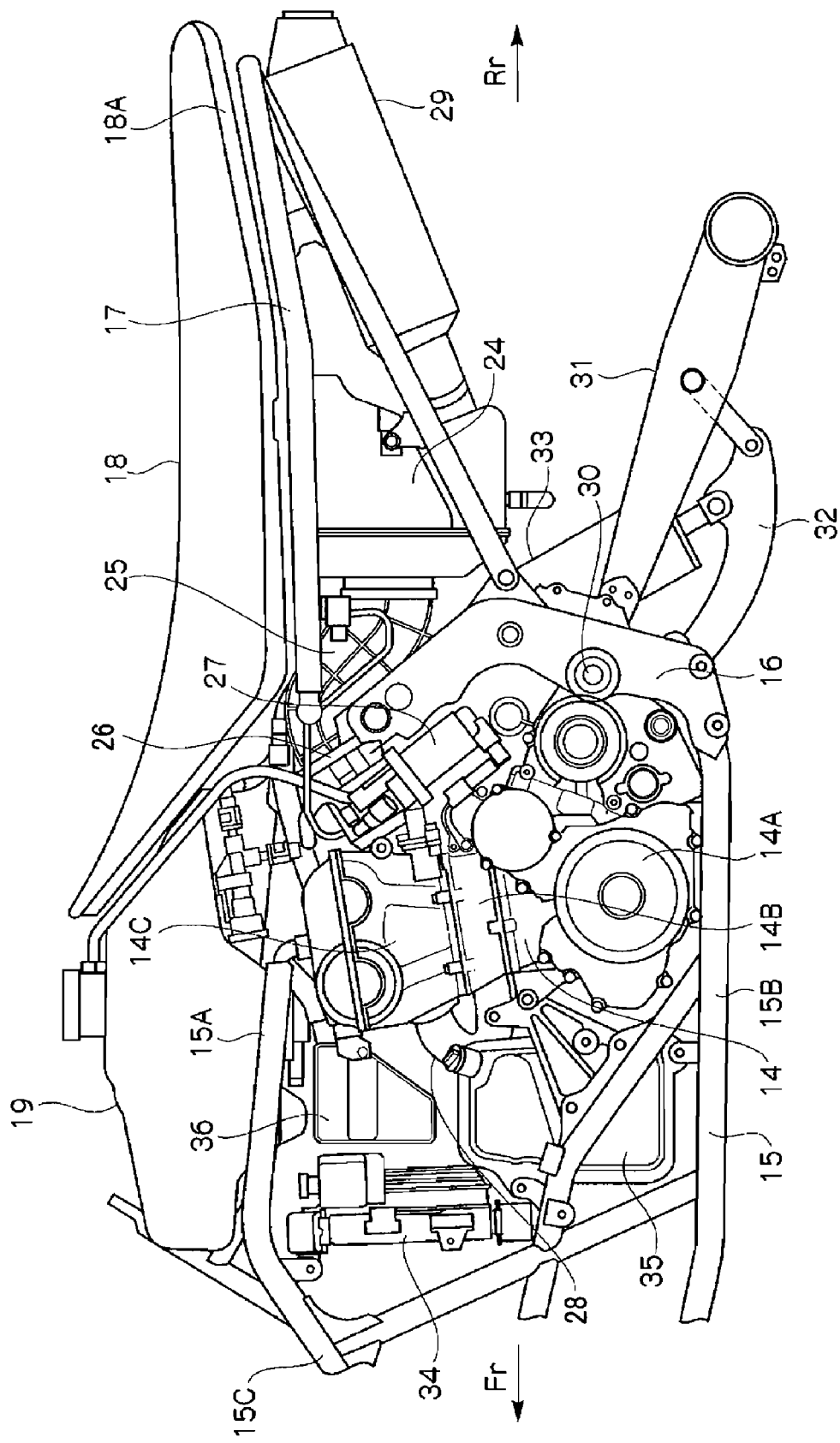
FIG. 3 is a side elevation of an engine unit and peripheral components of the all terrain vehicle according to the embodiment of the present invention.

The chassis frame herein is, as shown typically in FIG. 3, composed of a main frame 15 which includes an upper frame 15A, a lower frame 15B, a front frame 15C and so forth, a body frame 16, and a seat frame 17. It is to be understood that also the body frame 16 configures substantially a part of the main frame 15. These frame members provided, as being paired, to the left and right sides in the tread-wise direction are linked with crossing members with each other, to thereby configure the basic skeleton of the vehicle. In particular, a certain capacity of space is formed as being surrounded by the main frame 15 and the body frame 16, and in this space the engine unit 14 and so forth are housed.

The engine unit 14 mounted on the chassis frame, as being located between the front wheels 11 and the rear wheels 12, typically includes a water-cooled, 4-cycle, single-cylinder engine as a power unit of the vehicle, and the output thereof is transmitted via a transmission incorporated into an engine case 14A as being integrated therewith, to a driving sprocket. The engine unit 14 in this embodiment is configured as lubricating the engine based on the dry-sump system, and thereby has an oil tank independent of the engine unit 14. The driving sprocket, as will be detailed later, is linked with a driven sprocket of the rear wheels 12 using a driving chain, so as to enable rotational operation of the rear wheels 12.

On the rear frame 17, a straddle-type seat 18 is disposed while placing a seat base plate 18A (FIG. 3) in between, a fuel tank 19 is disposed on the front thereof, and a steering handle 20 and a steering shaft 21 supporting the same, used for operating the front wheels 11, are provided on the further front thereof. The fuel tank 19 is covered with a fuel tank cover 19A. The steering shaft 21 is supported at the lower end thereof by a shaft bush, which is located at around the axle of the front wheels at the center portion of the vehicle, as being freely rotatable, and is disposed, as shown in FIG. 1, as being inclined towards the engine side, that is, in the upper rear direction.

A front fender 22 is provided to the front of the vehicle so as to cover the front wheels 11 and the upper front portion of the chassis frame, and a rear fender is provided so as to cover the rear wheels 12 and the upper rear portion of the chassis frame. These front fender 22 and the rear fender 23 are molded using a synthetic resin.

Next, further referring to FIG. 3, an air cleaner box 24 having an air intake port 24a (see FIGS. 4A to 4C) is mounted in the rear of the body frame 16, wherein an intake pipe 25 extending out from the front portion of the air cleaner box 24 is connected to the throttle body 26. The throttle body 26 is connected to an intake port of the engine unit 14. From a fuel pump 27 connected to the fuel tank 19, fuel is supplied to an injector attached to the throttle body 26, so as to inject the fuel from the injector according to a predetermined timing. The engine unit 14 herein is successfully reduced in height as possible, by making the cylinder 14B thereof slightly inclined to the front.

On the other hand, the engine is attached with an exhaust pipe 28 on the front thereof. The exhaust pipe 28 connected to the cylinder head 14C of the cylinder 14B, as shown in FIG. 3, is projected towards the front, then routed through one side of the engine 1 in the tread-wise direction, and extended towards the rear of the vehicle. In this example, the exhaust pipe 28 is bent nearly in U-shape towards the right side of the engine in the side view as shown in FIG. 3, and is then extended towards a muffler 29 (exhaust silencer) disposed behind the air cleaner box 24, and connected thereto. The muffler 29 and the peripheral structure will be detailed later.

Figure 4A:
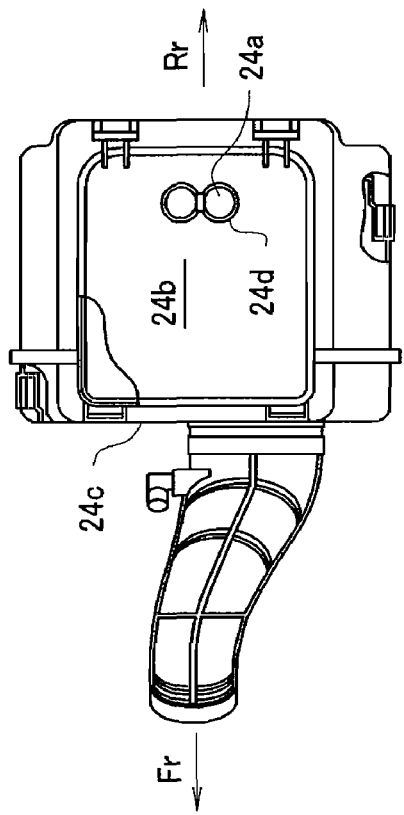
FIGS. 4A to 4C are side elevations showing an example of an air cleaner box according to the embodiment of the present invention.
Figure 4C:
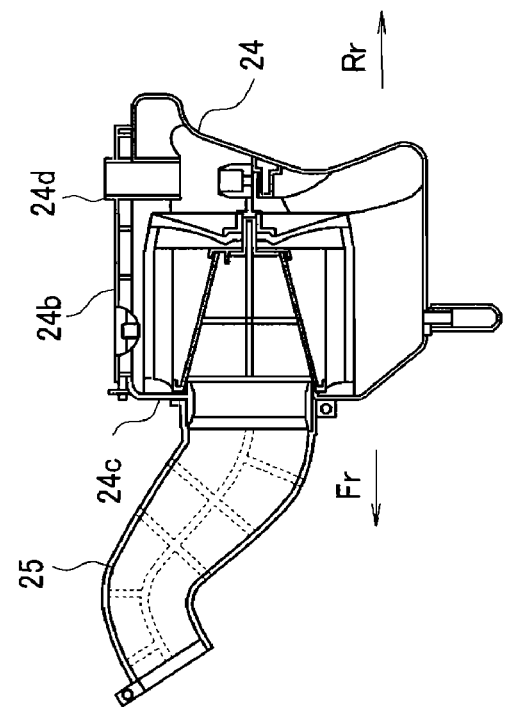
Figure 4B:
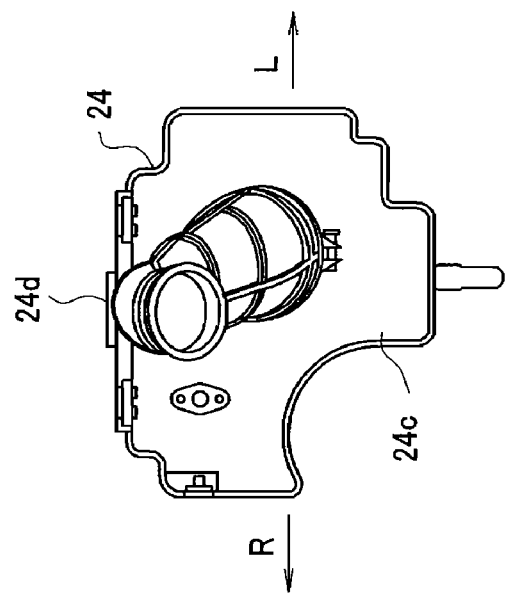

The air cleaner box 24 is configured, as shown in FIGS. 4A to 4C, as having an air intake port 24a on the top surface 24b thereof. In this case, a guide wall 24d is formed as being projected upward from the top surface 24b of the air cleaner box 24, so as to configure the intake port 24a opened upward by the guide wall 24d. On the other hand, the lower surface of the seat base plate 18A of the seat 18 is recessed upward to thereby form a recess (not shown), wherein the recess is opposed to the intake port 24a of the air cleaner box 24. The intake pipe 25 is extended from the front surface 24c of the air cleaner box 24.

In the above-described case, a swing arm 31 is supported in a swingable manner by a pivot 30 provided to the body frame 16 as shown in FIG. 3, wherein the axle of the rear wheels 12 is supported at the rear end of the swing arm 31. The swing arm 31 is linked through a cushion link 32 with a rear cushion unit 33, so that the rear wheels 12 are consequently supported through this shock-absorbing mechanism by the chassis frame. The front wheels 11 have the same shock-absorbing mechanism.

In the present invention, the steering shaft 21 is disposed between the front wheels 11 and the engine unit 14, and in the rear of the steering shaft 21, a radiator 34 is disposed closely thereto. Between the radiator 34 and the engine unit 14 as viewed in the side elevation of the vehicle, an oil tank 35 and an oil catch tank 36 of a breather unit are disposed.

Figure 5:
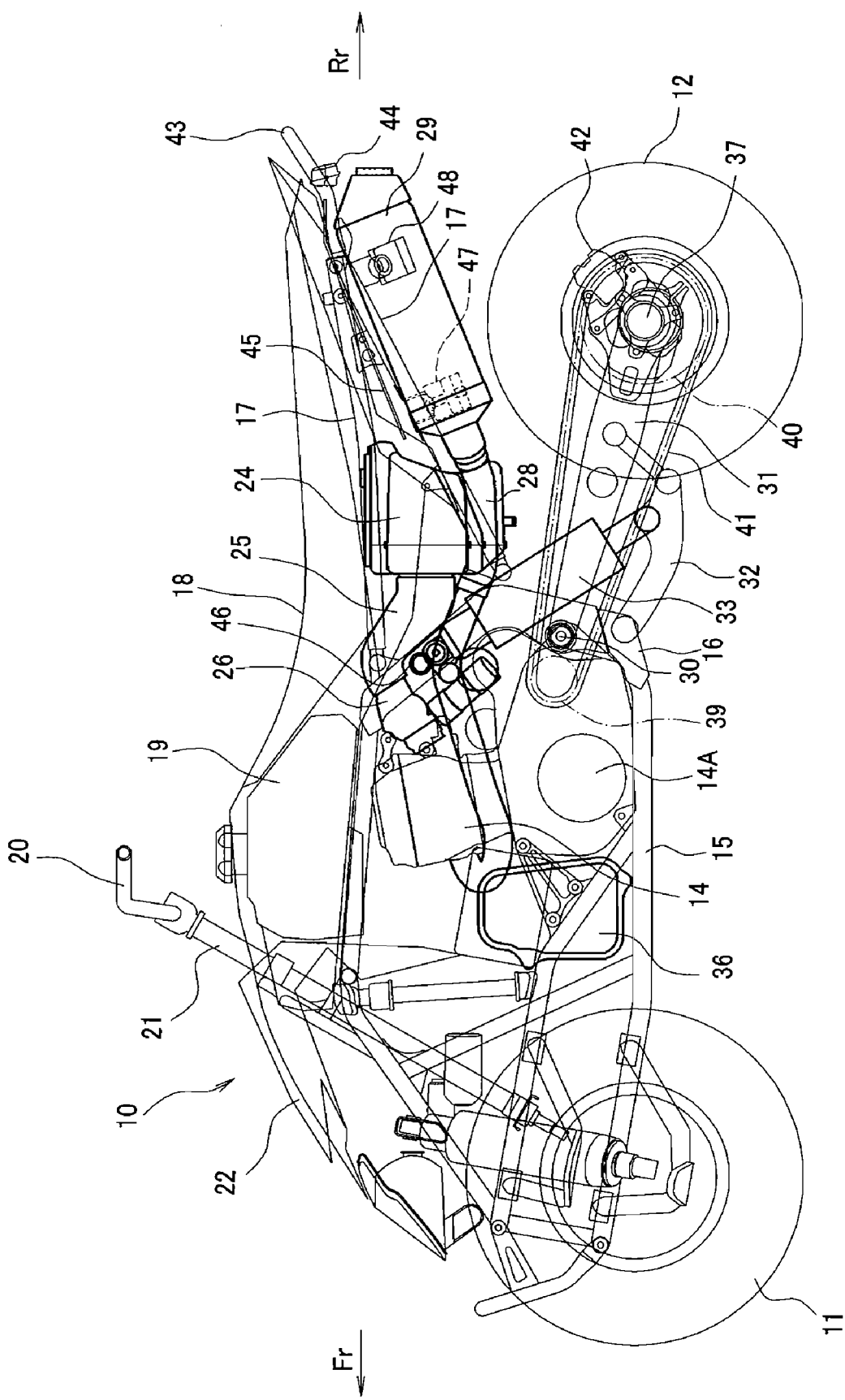
FIG. 5 is a side elevation showing an exemplary arrangement and configuration of a muffler and the peripheral components according to the embodiment of the present invention.
Figure 6:
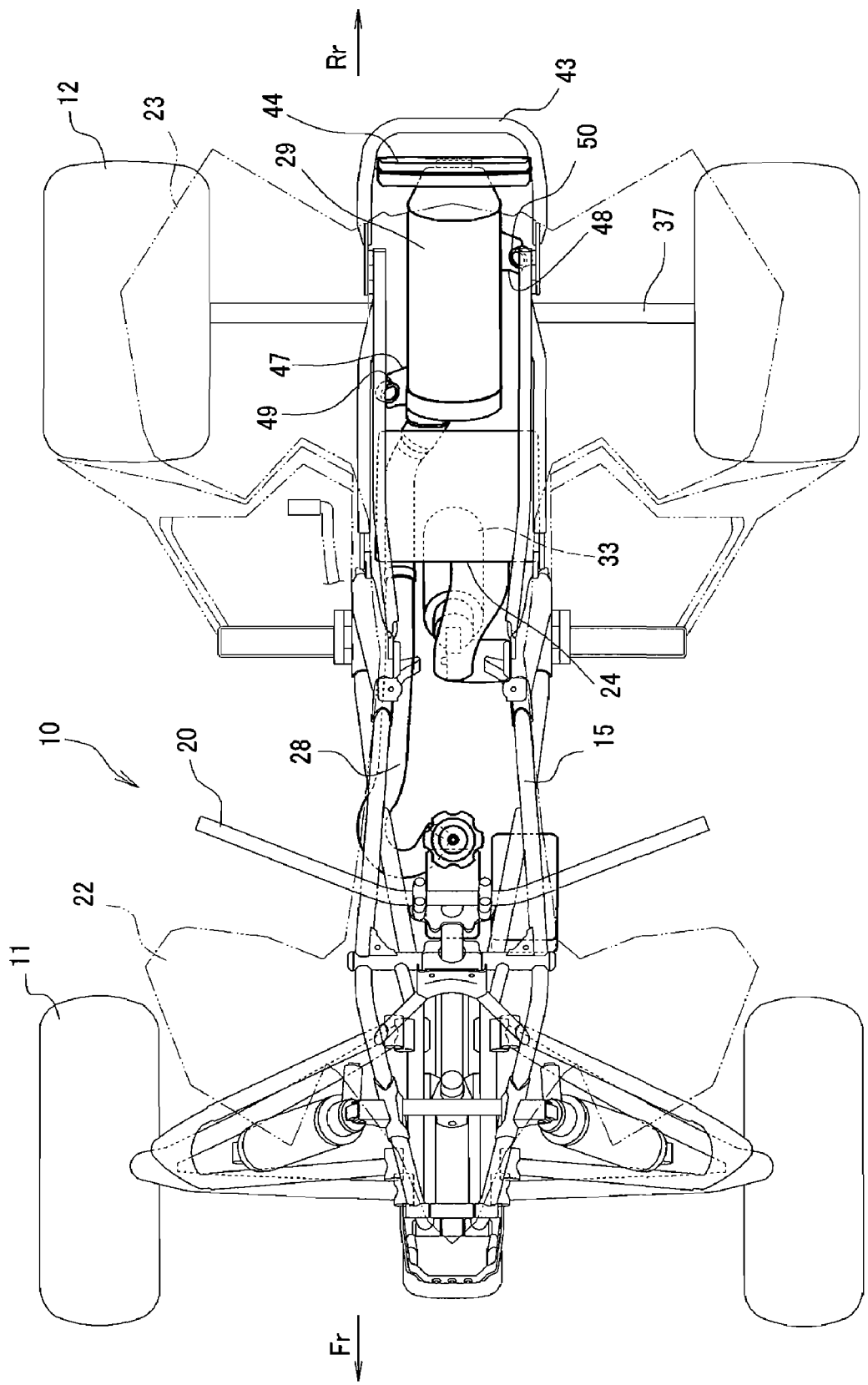
FIG. 6 is a plan view showing an exemplary arrangement and configuration of the muffler and the peripheral components according to the embodiment of the present invention.
Figure 9A:
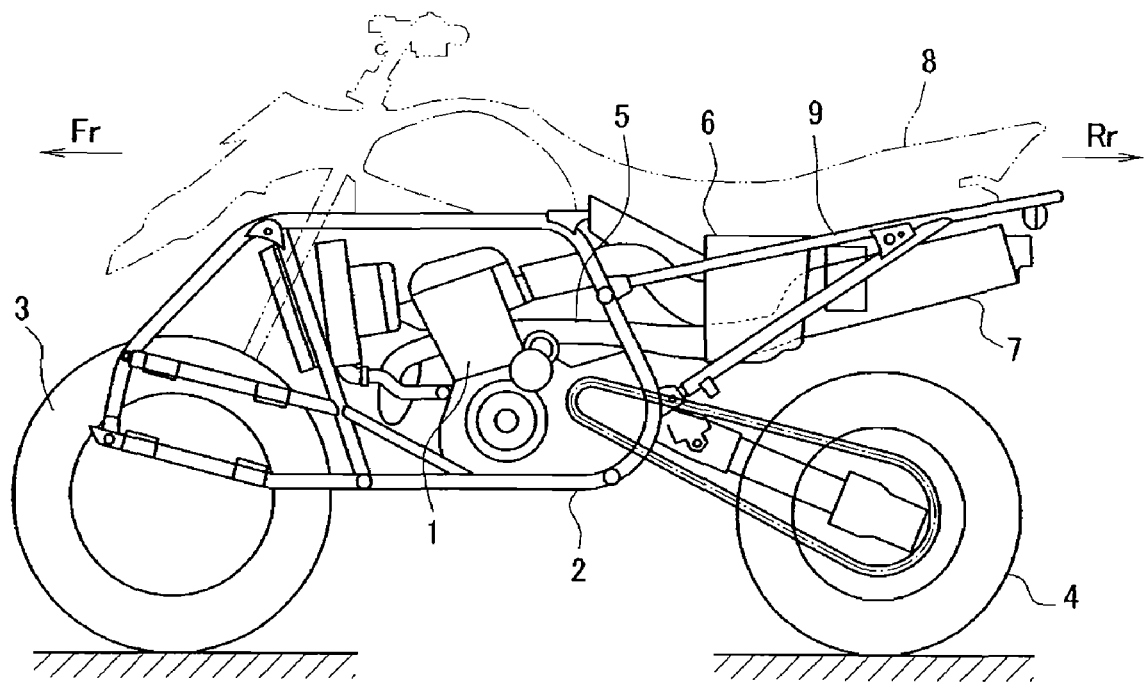
FIGS. 9A and 9B are a side elevation and a plan view or an example of a conventional all terrain vehicle.
Figure 9B:
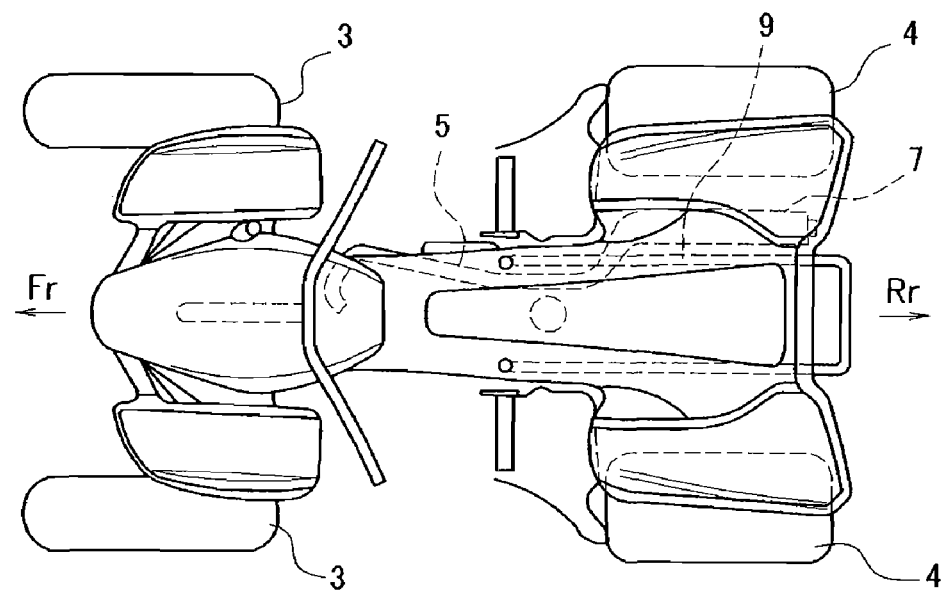

An exemplary arrangement and configuration of the muffler 29 and the peripheral components of the present invention will now be explained referring to FIG. 5 to FIG. 8 and so forth. First, as shown in FIG. 5 and FIG. 6, each of the rear wheels 12 is fixed at both ends of a rear axle shaft 37 supported in a freely rotatable manner at the rear end of the swing arm 31 which extends towards the rear while being supported at the front end thereof by a swing axle (pivot 30) which extends in the transverse direction of a body frame 16, and can swing in the vertical direction. In this case, as shown in FIG. 7 a shaft bush 38 supporting the rear axle shaft 37 in a freely rotatable manner is coupled with the rear ends of the individual swing arms 31. As is clear from FIG. 7 showing a rear view, the shaft bush 38 is disposed nearly at the center position in the transverse direction of the vehicle.

As shown in FIG. 5, motive power of the power unit is transmitted through the power transmission to the rear axle shaft 37. More specifically, the power transmission in this embodiment is composed of a driving sprocket 39 coupled with the output axle of the power unit, a driven sprocket 40 attached to the rear axle shaft 37, and a driving chain 41 interconnecting these sprockets 39, 40.

As shown in FIG. 7, on each of both ends of the shaft bush 38, there are disposed a power transmission (driven sprocket 40) transmitting driving force of the power unit to the rear axle shaft 37, and a braking device (brake caliper 42) exerting braking force on each of the rear wheels 12. The muffler 29 is routed through the inner edges of the driven sprocket of each of the power transmissions and the brake caliper 42 of the braking device, and disposed in a space between the left and right vertical planes $VP_1$, $VP_2$ (width W) in parallel with the direction of travel of the vehicle, below the seat 18. Specific supporting structure of the muffler 29 will be described later.

In FIG. 7, above the rear end of the muffler 29, a rear grip 43 connected to the rear end of the rear frame 17 is projected outward, wherein a tail lamp 44 is supported by the rear grip 43 (see also FIG. 5 and FIG. 6 for the arrangement and configuration of these components). As shown in FIG. 5, a heat shield is inserted between the seat 18 supported by the rear frame 17 and the muffler 29, making it possible to shield the seat 18 from heat conducted from the muffler 29.

As shown in FIG. 5 and FIG. 6, a rear cushion unit 33 supporting, as being mediated by the swing arm 31, the rear wheels 12 on the rear side of the power unit as being vertically cushioned, an air cleaner box 24 supplying a clean air to the engine of the power unit, and the muffler 29 are disposed in line in the longitudinal direction, as described in the above.

In this case, the upper end of the rear cushion unit 33 is supported by a bridge member 46 suspended between a pair of left and right main frames (body frame 16) composing the chassis frame, as being curved downward at the middle portion thereof in the transverse direction (see FIG. 8). An air intake passageway connecting the air cleaner box 24 and the engine, that is, the intake pipe 25 and throttle body 26 are longitudinally disposed as being routed through a space in the upper vicinity of the center portion of the bridge member 46, and the exhaust pipe connecting the engine and the muffler 29, that is, the exhaust pipe 28 is disposed as being laid over the top surface of an engine case 14A of the power unit and as being routed through a space in the lower vicinity of one end (right side) in the transverse direction of the bridge member 46.

The muffler 29 is connected, as shown in FIG. 5, to the rear end of the exhaust pipe 28 extending from the exhaust port of the engine to the rear side, under the center portion of the seat 18. The muffler 29 is disposed also as being inclined downward to the front, from the rear end of the seat 18 towards the pivot 30 to which the front end of the rear swing arm 31 is supported, relative to the seat 18 disposed near-horizontally.

The muffler 29 is further supported, at the front portion and the rear portion thereof, by a pair of rear frames 17 holding thereon the seat 18, the front supported portion thereof being provided on one side (right side) in the transverse direction in which the exhaust pipe is connected, and the rear supported portion thereof being provided at least to the flank on the opposite side (left side) of the front supported portion. In this case, attachment brackets 47, 48 are attached to the front supported portion and the rear supported portion, respectively, and these brackets 47, 48 are tightened to the rear frames 17 while placing cushion components 49, 50 in between.

The exhaust pipe 28 is further connected to the front end of the muffler 29, as being routed below the bridge member 46, and bent downward as being routed beside the lower portion of the air cleaner box 24, and the air intake port 24a of the air cleaner box 24 is provided to the rear portion of the top surface opposed to the bottom surface of the seat 18. In this case, as shown in FIG. 4B, the right bottom portion of the air cleaner box 24 is formed as being recessed so that the exhaust pipe 28 can be laid therethrough.

In the above-described configuration, first, the muffler 29 having a relatively large weight is disposed at the center portion in the tread-wise direction of the vehicle, below the seat 18, typically as shown in FIG. 6 and FIG. 7. By this configuration, the center of gravity of the vehicle can be set at the center of the vehicle (tread-wise direction), and thereby the weight of the vehicle in the tread-wise direction thereof is well balanced, and the operational stability can consequently be improved.

By setting the center of gravity of the vehicle at the center of the vehicle in this way, particularly the yawing moment and rolling moment under driving are reduced, and thereby the steering performance, anti-rolling property and so forth can be improved. Another advantages is that rear frame 17 have substantially no twisting load applied thereto, so that conditions for the strength can be relieved, and relative increase in the rigidity and strength can further reduce the weight as a consequence.

Because the muffler 29 in this example was disposed between the shaft bush 38 of the rear axle shaft 37, which is smaller in size as compared with the braking device and power transmission, and the seat 18, a longer cushion stroke of the rear wheels 12 is now available, and the comfortability in riding can be improved. Another advantage is such that the capacity of the muffler 29 can be increased, so that not only the silencing performance but also output performance of the engine can be improved.

The air intake passageway composed of the intake pipe 25, throttle body 26 and so forth, affecting the output performance of the engine, can be formed as having smooth curves, so that the air intake efficiency can be raised, and thereby the output performance of the engine can be improved. In particular, a portion where a carburetor (throttle body 26), which is close to a combustion chamber of the engine, is located is largely affected by geometry of the passageway.

Because the air intake passageway and the exhaust pipe 28 heated to high temperatures due to exhaust gas are disposed vertically apart from each other, while placing the bridge member 46 in between as shown in FIG. 8, the intake air is prevented from heating, and this contributes to improvement in the charging efficiency and output. Because also the exhaust pipe 28 is disposed almost straightly along the upper surface of the engine case, the exhaustion resistance can be reduced and thereby the output is improved. The exhaust pipe 28 herein does not swell out into the right side of the vehicle, so that an advantage is raised in that, even when a kick arm 51 (FIG. 6) is provided, a sufficient distance from the exhaust pipe 28, and further from the rear fender 23 can be ensured.

It is also made possible to increase the capacity of the air cleaner box 24 disposed below the center portion of the seat 18, and to ensure a large gap between the center portion of the rider's seat 18 allowing the driver to sit thereon, and the muffler 29. This configuration successfully prevents heated air from being stagnated in these portions or areas, and makes it possible to introduce cold air into the air cleaner box 24, and thereby improves the charging efficiency in the process of air intake, also from this point of view.

The foregoing paragraphs have explained the present invention referring to a preferred embodiment, wherein the present invention is by no means limited to the above-described embodiment, instead allowing any modifications without departing from the scope of the invention.

For example, the present invention is also effectively applicable to any engine systems other than that described in this embodiment, and also vehicles to which the present invention is adoptable may be motorcycles, besides the ATV.

What is claimed is:

1. An all terrain vehicle comprising:
   a vehicle body comprising:
      a midship section;
      a pair of left and right main frames to the rear of said midship section; and
      a rear section extending rearward of said pair of left and right main frames;
   left and right front wheels and rear wheels,
   a power unit including an engine and a transmission integrated therewith, mounted in the midship section of the vehicle body between said front and rear wheels,
   an air cleaner box supplying a clean air to said engine of said power unit, said air cleaner box having a back portion facing rearward, is disposed behind said power unit in line in the longitudinal direction,
   a fuel tank disposed above said power unit, a rider's seat provided on the rear section of the vehicle body behind said fuel tank,
   a rear swing arm mounted on the vehicle body swingable in a vertical direction, rotatably supporting a rear axle shaft at the rear end thereof,
   a power transmission transmitting driving force of said power unit to said rear axle shaft is disposed at one side of an end of said rear swing arm in a vehicle width direction,
   a rear braking device disposed at another side of an end of said rear swing arm in the vehicle width direction, and
   an exhaust silencer is disposed in a space between said power transmission and said rear braking device in a plan view, under said rider's seat, and
   wherein the rear section comprises a rear grip extending rearward of the rear section,
   wherein said exhaust silencer is supported, at a front portion and a rear portion thereof, by a pair of rear frames upwardly extended from said pair of left and right main frames towards the rear so as to hold thereon said rider's seat,
   wherein said exhaust silencer is inclined downward to the front along said rear frames, from a rear end of said rider's seat towards a swing pivot of said rear swing arm,
   wherein an exhaust end of said exhaust silencer is forward of said rear grip
   wherein said exhaust silencer further comprises a front end opposite the exhaust end,
   wherein the front end of the exhaust silencer is opposite a lower section of the back portion of the air cleaner box, and
   wherein said air cleaner box further comprises a forward recess formed in the lower section.

2. The all terrain vehicle according to claim 1, further comprising a rear cushion unit supporting said rear swing arm as being vertically cushioned, wherein said rear cushion unit, said air cleaner box and said exhaust silencer are disposed behind said power unit in line in the longitudinal direction.

3. The all terrain vehicle according to claim 2, further comprising:
   a bridge member suspended between the pair of left and right main frames, the bridge member supporting an upper end of said rear cushion unit;
   an air intake passageway connecting said air cleaner box and said engine, the air intake passageway including an intake pipe, an injector and a throttle body; and
   an exhaust pipe connecting said engine and said exhaust silencer, wherein the air intake passageway is disposed above said bridge member so as to form smooth curves, and wherein the exhaust pipe is disposed in a space between the top surface of an engine case of said power unit and said bridge member, away from said rear cushion unit in the vehicle width direction.

4. The all terrain vehicle according to claim 3, wherein said exhaust silencer is connected to the rear end of said exhaust pipe which extends from an exhaust port of said engine towards the rear side at a position below the center portion of said rider's seat.

5. The all terrain vehicle according to claim 4, wherein said exhaust silencer is supported at the front portion by a front supported portion thereof being provided on one side in the vehicle width direction in which said exhaust pipe is connected, and the rear portion is supported by a rear supported portion thereof being provided at least on the opposite side of said front supported portion.

6. The all terrain vehicle according to claim 4, wherein said exhaust pipe is connected to a front end of said exhaust silencer, as being routed below a bridge member and beside a lower portion of said air cleaner box, and said air cleaner box is provided with an air intake port disposed on a top surface portion thereof opposed to a bottom surface of said rider's seat.

7. The all terrain vehicle according to claim 1, wherein said power transmission comprises a driving sprocket provided on said power unit, a driven sprocket provided on said rear axle shaft, and a driving chain connected therebetween.

8. The all terrain vehicle according to claim 1, further comprising:
    a rear plane formed from a line extending from the rear grip and tangent to at least one of the rear wheels,
    wherein said exhaust end of said exhaust silencer is forward of said rear plane.

9. An all terrain vehicle comprising:
    a vehicle body comprising:
        a midship section;
        a pair of left and right main frames to the rear of said midship section; and
        a rear section extending rearward of said pair of left and right main frames;
    left and right front wheels and rear wheels,
    a power unit including an engine and a transmission integrated therewith, mounted in the midship section of the vehicle body between said front and rear wheels,
    a fuel tank disposed above said power unit, a rider's seat provided on the rear section of the vehicle body behind said fuel tank,
    a rear swing arm mounted on the vehicle body swingable in the a vertical direction, rotatably supporting a rear axle shaft at the rear end thereof,
    a power transmission transmitting driving force of said power unit to said rear axle shaft is disposed at one side of an end of said rear swing arm in a vehicle width direction,
    a rear braking device disposed at another side of an end of said rear swing arm in the vehicle width direction,
    an exhaust silencer is disposed in a space between said power transmission and said rear braking device in a plan view, under said rider's seat, having an exhaust end and a front end opposite the exhaust end,
    an air cleaner box supplying a clean air to said engine of said power unit, said air cleaner box having a back portion facing rearward, and is disposed behind said power unit in line in the longitudinal direction, and
    a rear grip extending rearward of the rear section,
    a rear plane formed from a line extending from the rear grip and tangent to at least one of the rear wheels,
    wherein said exhaust silencer is supported, at a front portion and a rear portion thereof, by a pair of rear frames upwardly extended from said pair of left and right main frames towards the rear so as to hold thereon said rider's seat,
    wherein said exhaust silencer is inclined downward to the front along said rear frames, from a rear end of said rider's seat towards a swing pivot of said rear swing arm,
    wherein said exhaust end of said exhaust silencer is forward of said rear plane,
    wherein the front end of the exhaust silencer is opposite a lower section of the back portion of the air cleaner box, and
    wherein said air cleaner box further comprises a forward recess formed in the lower section.

* * * * *